United States Patent
Gelbart et al.

(10) Patent No.: US 6,665,121 B2
(45) Date of Patent: Dec. 16, 2003

(54) MULTI-CHANNEL IMAGE RECORDING APPARATUS

(75) Inventors: Daniel Gelbart, Vancouver (CA); Russell Cork, Vancouver (CA); Nissim Pilossof, Rehovot (IL)

(73) Assignee: Creo IL. Ltd., Herzlia (IL)

( * ) Notice: Subject to any disclaimer, the term of this patent is extended or adjusted under 35 U.S.C. 154(b) by 75 days.

(21) Appl. No.: 09/985,946

(22) Filed: Nov. 6, 2001

(65) Prior Publication Data
US 2003/0095317 A1 May 22, 2003

(51) Int. Cl.[7] ................................................ G02B 27/10
(52) U.S. Cl. .......................................... 359/619; 359/626
(58) Field of Search ................................. 359/626, 625, 359/621, 619, 237

(56) References Cited
U.S. PATENT DOCUMENTS 5,333,077 A    7/1994   Legar et al. ................. 359/619
5,900,981 A    5/1999   Oren et al. .................. 359/619
6,061,489 A *  5/2000   Ezra et al. ................... 385/115
6,137,631 A   10/2000   Moulin ....................... 359/618
6,477,955 B1  11/2002   Landsman

* cited by examiner

*Primary Examiner*—Scott J. Sugarman
*Assistant Examiner*—Richard Hanig
(74) *Attorney, Agent, or Firm*—Jane M. Love; Hale and Dorr LLP (57) ABSTRACT

An optical head comprising an array of laser diodes (LDA) where each member of the LDA having a fast axis direction and a slow axis direction of beam divergence, a spatial light modulator (SLM), an imaging lens, and a Micro-Scramblers array (MSA) where each member of the MSA has exit apertures and each member of the MSA is associated with a member of the LDA for scrambling the light only in the direction of the slow axis of the member of the LDA. The optical head can be incorporated into an external-drum electro-optical plotter or a flat bed electro-optical plotter.

19 Claims, 9 Drawing Sheets

MULTI-CHANNEL IMAGE RECORDING APPARATUS

FIELD OF THE INVENTION

The present invention relates to optical imaging heads that produce a plurality of light spots on light sensitive medium such as photographic film or a printing plate. The optical head incorporates an array of laser diodes (LDA) as a light source, a Micro-Scramblers Array (MSA) as a beam-shaping element, a Spatial Light Modulator (SLM) for spatial modulation of the light emitted from the LDA in accordance with data representing the image to be obtained, and an imaging lens for imaging the SLM on the light sensitive medium.

BACKGROUND OF THE INVENTION

Multi-channel optical imaging systems are well known in the art and are currently being used in a variety of applications, including imaging of different printing media. Such systems often utilize a LDA and a SLM as a light source. In a typical offset platesetter for example, the LDA is used as a light source for illuminating the SLM, which, in turn, spatially modulates the light in accordance with the pattern to be imaged. The SLM on the other hand, is imaged by an imaging lens on the photosensitive medium, such as an offset printing plate, and thus the desired pattern is achieved.

Figure 1A:
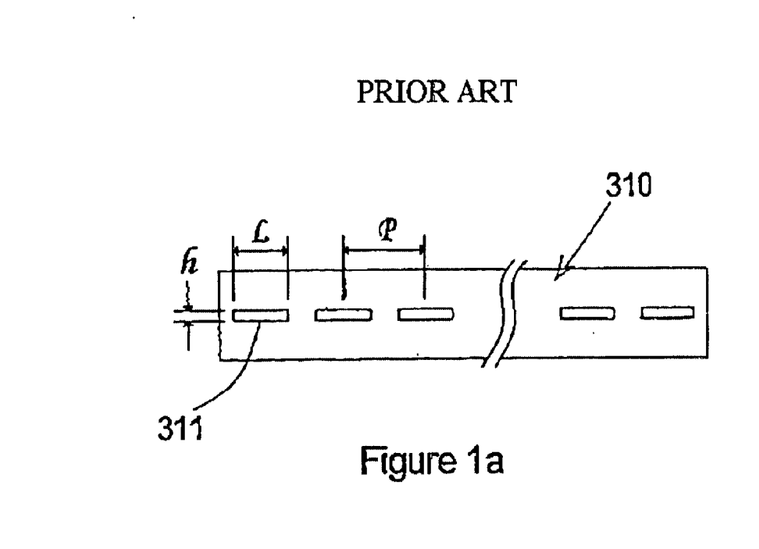
FIG. 1a is a schematic illustration of a conventional LDA.
Figure 1B:
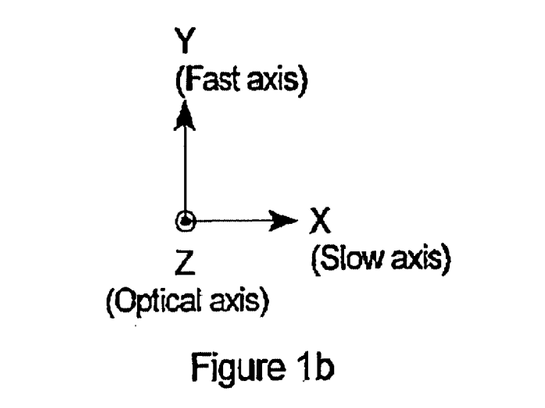
FIG. 1b presents the coordinate system used throughout the following description.

A LDA can be an array of ordered individual laser emitters, a laser-diode bar, or a laser-diode stack. For simplicity, all these options will be referred to as LDA hereinbelow. A laser diode bar (linear array of laser diode emitters) will be used as an example in the explanations below (FIG. 1a). It will, however, be appreciated by any person skilled in the art, that the embodiments described may be easily scaled up in Y direction to a two-dimensional array such as a diode laser bars stack. All the conclusions drawn for a linear array will be valid for a two-dimensional array. In many applications, such as imaging of thermal offset printing plates, the individual emitters of the LDA are expected to deliver a significant amount of light power, namely, from several hundred milliwatts to several watts. In such cases, multimode laser diode emitters are used. FIG. 1a illustrates a conventional art LDA 310. The individual emitters 311 are usually with length $\mathcal{L}$ between 50 and 150 $\mu$m and height $h$ of approximately 1 $\mu$m. The pitch $\mathcal{P}$ of the emitters 311 can be of several hundred micrometers. All references to X, Y and Z directions hereinbelow refer to the coordinate system illustrated in FIG. 1b. The emission properties of the emitters 311 are different in the directions X (parallel to the LDA length) and Y (perpendicular to the LDA length). The beam divergence in the Y direction is usually between 50 and 90 degrees full angle, while the beam divergence in X direction is usually well below 20 degrees full angle. It is commonly accepted for the Y-axis to be termed "fast axis" and the X-axis to be termed "slow axis". Thus, the orientation of the LDA 310 in an optical system is defined in the XYZ coordinate system by the fast and slow axes. The Z-axis is considered an optical axis of the optical system.

An important part of optical imaging heads utilizing LDA and SLM is the illumination system of the SLM. There are a number of prior art works tackling the issue of illuminating an SLM by LDA, for example U.S. Pat. No. 5,900,981 to Oren et al. and U.S. Pat. No. 5,333,077 to Legar et al.

Figure 2A:
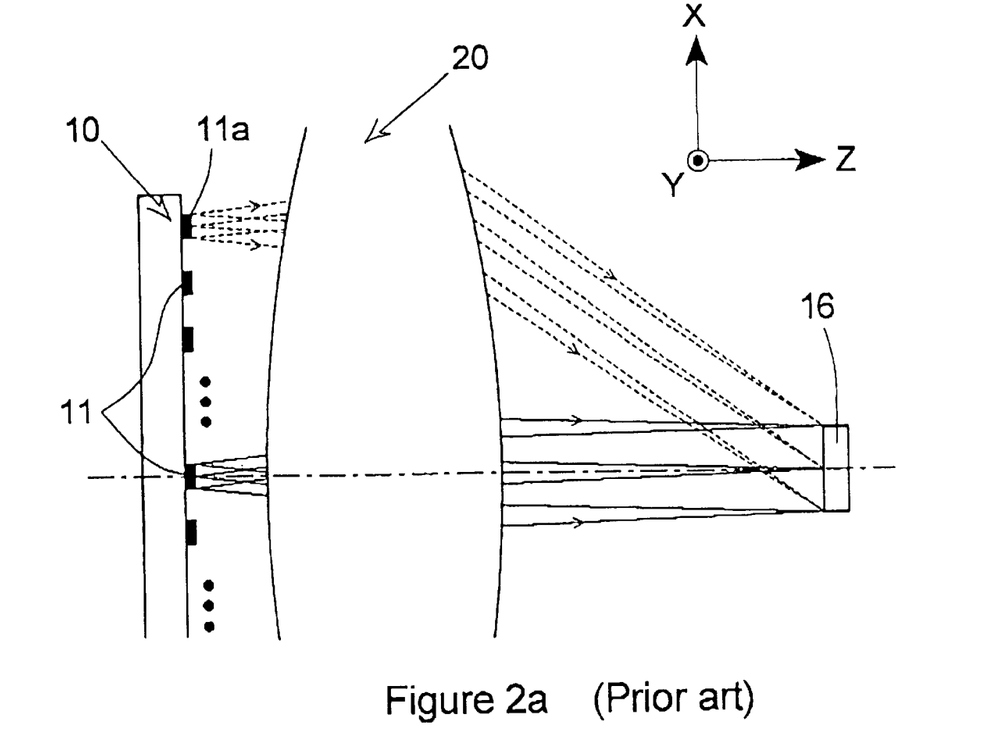
FIGS. 2a and 2b schematically illustrate a conventional SLM illumination system.
Figure 2B:
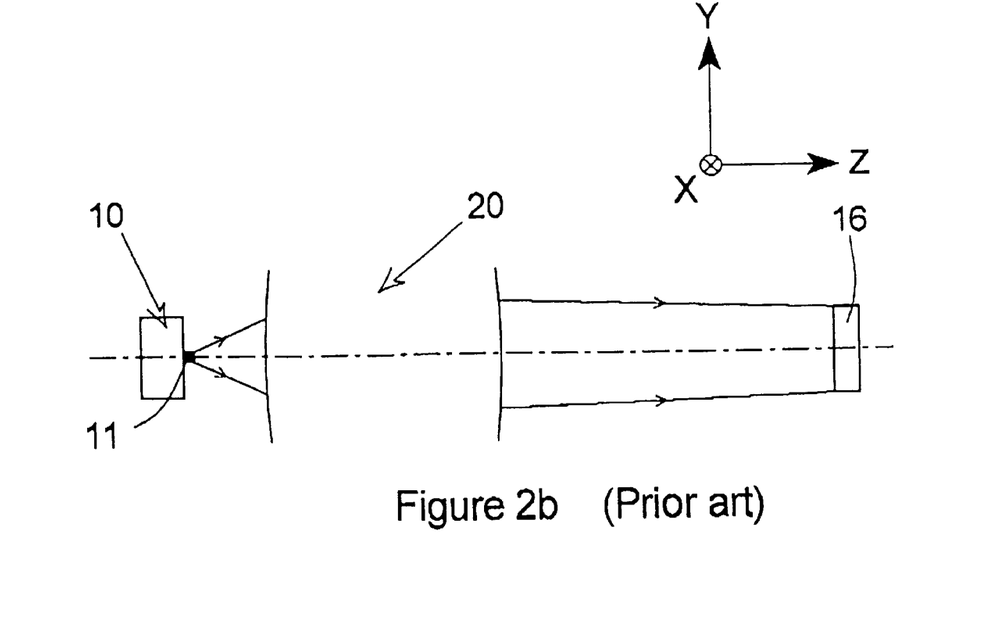

FIGS. 2a and 2b schematically illustrate an optical system 20 for illumination of SLM 16. FIG. 2a schematically illustrates the propagation of the beams in the X-Z plane (the plane of the slow axis) and FIG. 2b schematically illustrates the propagation of the beams in the Y-Z plane (the plane of the fast axis). The main idea in this, as in most illumination systems, is to image each individual emitter 11 on the SLM 16 by overlapping their images, so that each point on the SLM 16 receives light from each emitter 11. This method of illumination provides a high degree of redundancy, namely, partial or total loss of emitting abilities of one or more emitters 11 of LDA 10 will result in decreased illumination power, but will hardly affect the power distribution over SLM 16.

Figure 3A:
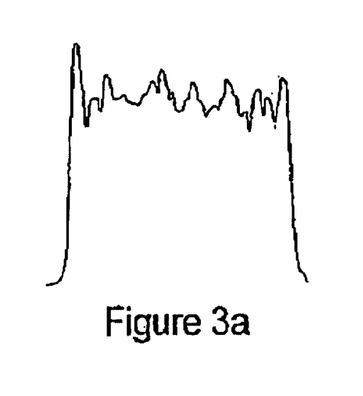
FIGS. 3a and 3b illustrate typical near field power distribution of a laser Diode near field.
Figure 3B:
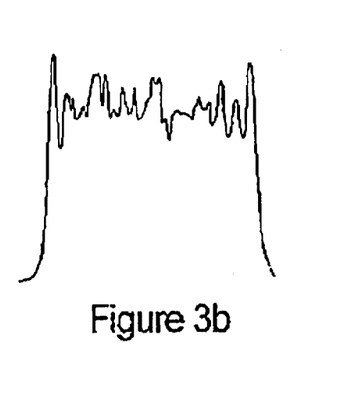
Figure 3C:
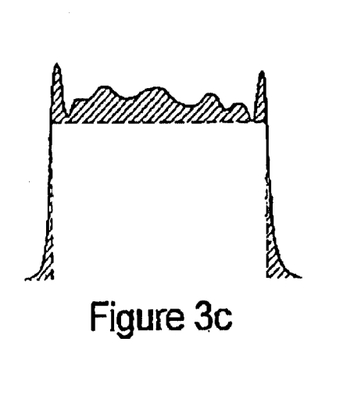
FIG. 3c illustrates typical prior art SLM illumination power distribution along the slow axis.

An important characteristic of LDA-SLM imaging systems is the uniformity of the SLM illumination. The illumination method of FIGS. 2a and 2b provides illumination which, in each point of the SLM 16, is a sum of the contributions of the individual emitters 11 of the LDA 10. However, as was already mentioned, a wide range of contemporary applications requires high-power LDAs of multimode emitters. The near field spatial power distribution of a multimode laser emitter along the slow axis is highly non-uniform and variable over time, depending on parameters such as current through the diode, junction temperature, etc. In a laser diode bar there is a tendency to similarity in the near field power distribution between the individual emitters. FIGS. 3a and 3b illustrate the spatial power distribution along the slow axis of two 150 $\mu$m long emitter members of a commercially available laser diode bar and clearly indicate this similarity. The illumination pattern of the SLM 16 is an overlap of the images of the individual emitters 11. Typical power distribution of such illumination pattern along the slow axis direction is illustrated in FIG. 3c. It can be seen that the distribution approximately resembles the power distribution of the individual LDA members and therefore is highly non-uniform.

The non-uniformity of the SLM illumination leads to uneven power distribution among the writing beams, causing undesired image density irregularities. The non-uniformity of the SLM illumination can be compensated by using a SLM with calibration capabilities for each channel. In this case, all channels are equalized to the least illuminated one. The result of such calibration is an even power distribution among the writing channels, at the expense of energy loss. The amount of energy lost is illustrated in FIG. 3c by the hatched area and in some cases can reach several tens of percents.

Another method of obtaining a uniform illumination of the SLM is disclosed in U.S. Pat. No. 6,137,631 to Moulin. The inventor suggests using a glass blade as a mixing means for obtaining substantially uniform illumination. The proposed embodiments include a focusing lens for delivering the light emitted by each emitter of the LDA to the entrance aperture of a single (common to all emitters) mixing glass blade, which should have a significant length (It is well known to any person skilled in the art that good mixing capabilities can be obtained when the length of the blade is at least ten times greater than its aperture diagonal). These features increase the complexity and the cost of the system. The main disadvantage, however, is the significant loss of brightness in the slow axis direction (by factor $\mathcal{L}/\mathcal{P}$, FIG. 1a), making the proposed embodiments low energy efficient.

SUMMARY OF INVENTION

The present invention provides a multi-beam, LDA-SLM based optical imaging head with a high degree of illumination uniformity of the SLM.

The present invention additionally provides a high energy-efficient LDA-SLM based, multiple laser-beam recording apparatus, free of image density irregularities due to non-uniform illumination of the SLM.

In a first embodiment, the present invention comprises an optical head. The optical head comprises an array of laser diodes (LDA) where each member of the LDA having a fast axis direction and a slow axis direction of beam divergence, a spatial light modulator (SLM), an imaging lens; and a Micro-Scramblers array (MSA) where each member of the MSA has exit apertures and each member of the MSA is associated with a member of the LDA for scrambling the light only in the direction of the slow axis of the member of the LDA.

In another embodiment, the present invention comprises an external-drum electro-optical plotter comprising an optical head. The optical head comprises an array of laser diodes (LDA) where each member of the LDA having a fast axis direction and a slow axis direction of beam divergence, a spatial light modulator (SLM), an imaging lens; and a Micro-Scramblers array (MSA) where each member of the MSA has exit apertures and each member of the MSA is associated with a member of the LDA for scrambling the light only in the direction of the slow axis of the member of the LDA.

In yet another embodiment, the present invention comprises a flatbed electro-optical plotter comprising an optical head. The optical head comprises an array of laser diodes (LDA) where each member of the LDA having a fast axis direction and a slow axis direction of beam divergence, a spatial light modulator (SLM), an imaging lens; and a Micro-Scramblers array (MSA) where each member of the MSA has exit apertures and each member of the MSA is associated with a member of the LDA for scrambling the light only in the direction of the slow axis of the member of the LDA.

In another embodiment, the present invention is directed to a method of producing a plurality of writing spots on a photosensitive medium, comprising the steps of (i) providing an array of laser diode emitters (LDA), wherein said LDA having exit apertures and wherein each member of said LDA having a fast axis direction and a slow axis direction of beam divergence; (ii) providing an array of Micro Scramblers (MSA), wherein said MSA having exit apertures and wherein each of said individual Micro Scramblers associated with one of said laser diode emitters; (iii) providing a spatial light modulator (SLM); (iv) providing optical means for imaging the exit apertures of said MSA; and (v) imaging the exit aperture of each of said Micro Scramblers on said photosensitive medium.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated exemplary embodiments of the invention.

Other objects of the present invention will be evident to those of ordinary skill, particularly upon consideration of the following detailed description of exemplary embodiments.

BRIEF DESCRIPTION OF THE DRAWINGS

The invention is herein described, by way of example only, with reference to the accompanying drawings, wherein.

DETAILED DESCRIPTION

In the following detailed description, numerous specific details are set forth regarding the system and method and the environment in which the system and method may operate, etc., in order to provide a thorough understanding of the present invention. It will be apparent, however, to one skilled in the art that the present invention may be practiced without such specific details. In other instances, well-known components, structures and techniques have not been shown in detail to avoid unnecessarily obscuring the subject matter of the present invention. Moreover, various examples are provided to explain the operation of the present invention. It should be understood that these examples are exemplary. It is contemplated that there are other methods and systems that are within the scope of the present invention. Also, the same reference numerals are used in the drawings and in the description to refer to the same elements to simplify the description.

The SLM used in imaging systems can modulate the light beam's amplitude, phase, or direction of propagation (diffractive SLM) and can have one-dimensional or two-dimensional modulating properties. The fundamental principles of the present invention can be applied to any of the different SLM types. As an example, in the following explanations a one-dimensional SLM will be used. It will be appreciated by any person skilled in the art, that the same principles can be applied to two-dimensional SLMs, by simple system scaling in the Y direction.

Figure 4A:
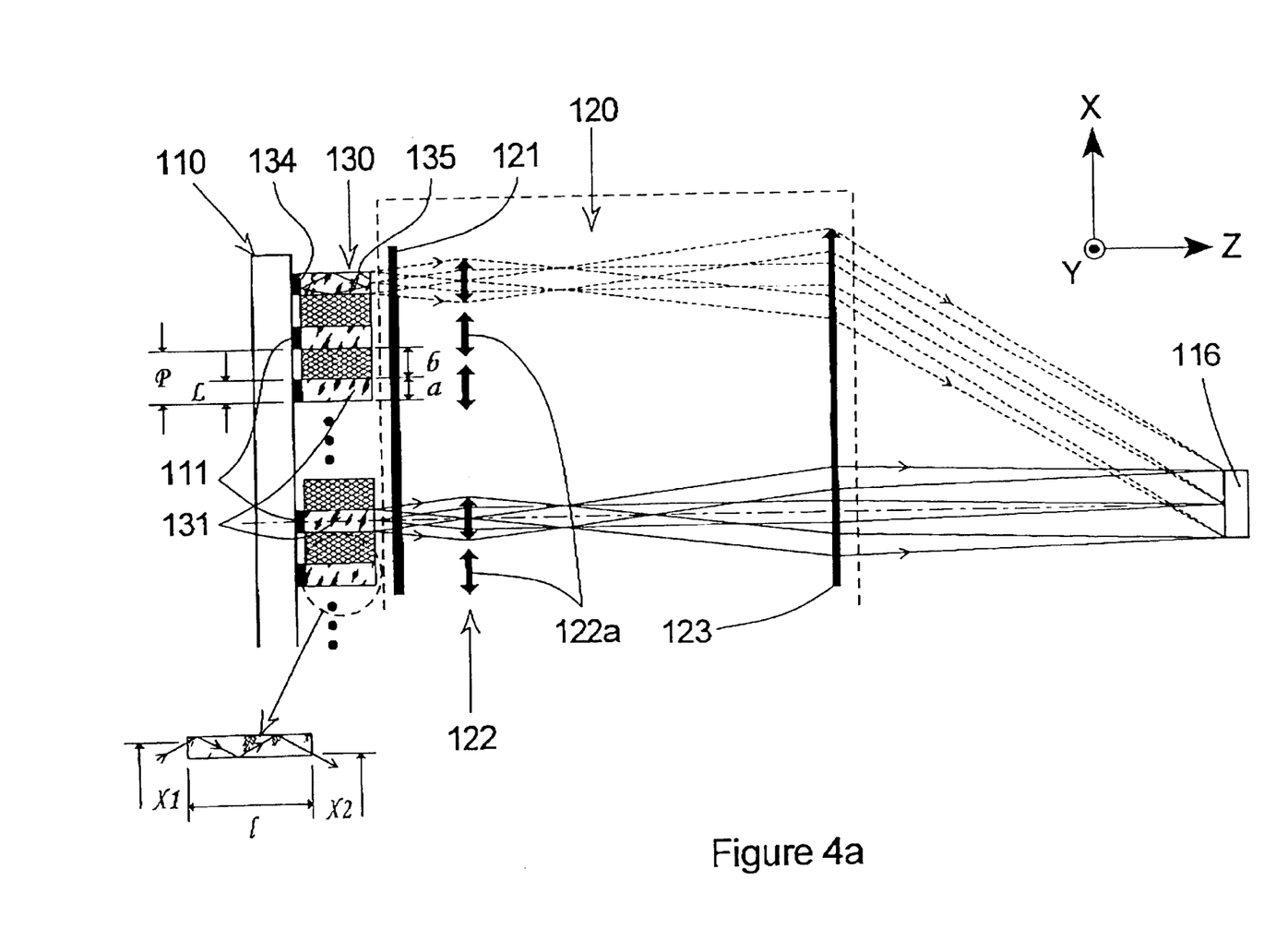
FIGS. 4a and 4b illustrate the beams propagation in an optical imaging head incorporating LDA-SLM system with an array of one-dimensional micro-scramblers, according to the present invention.
Figure 4B:
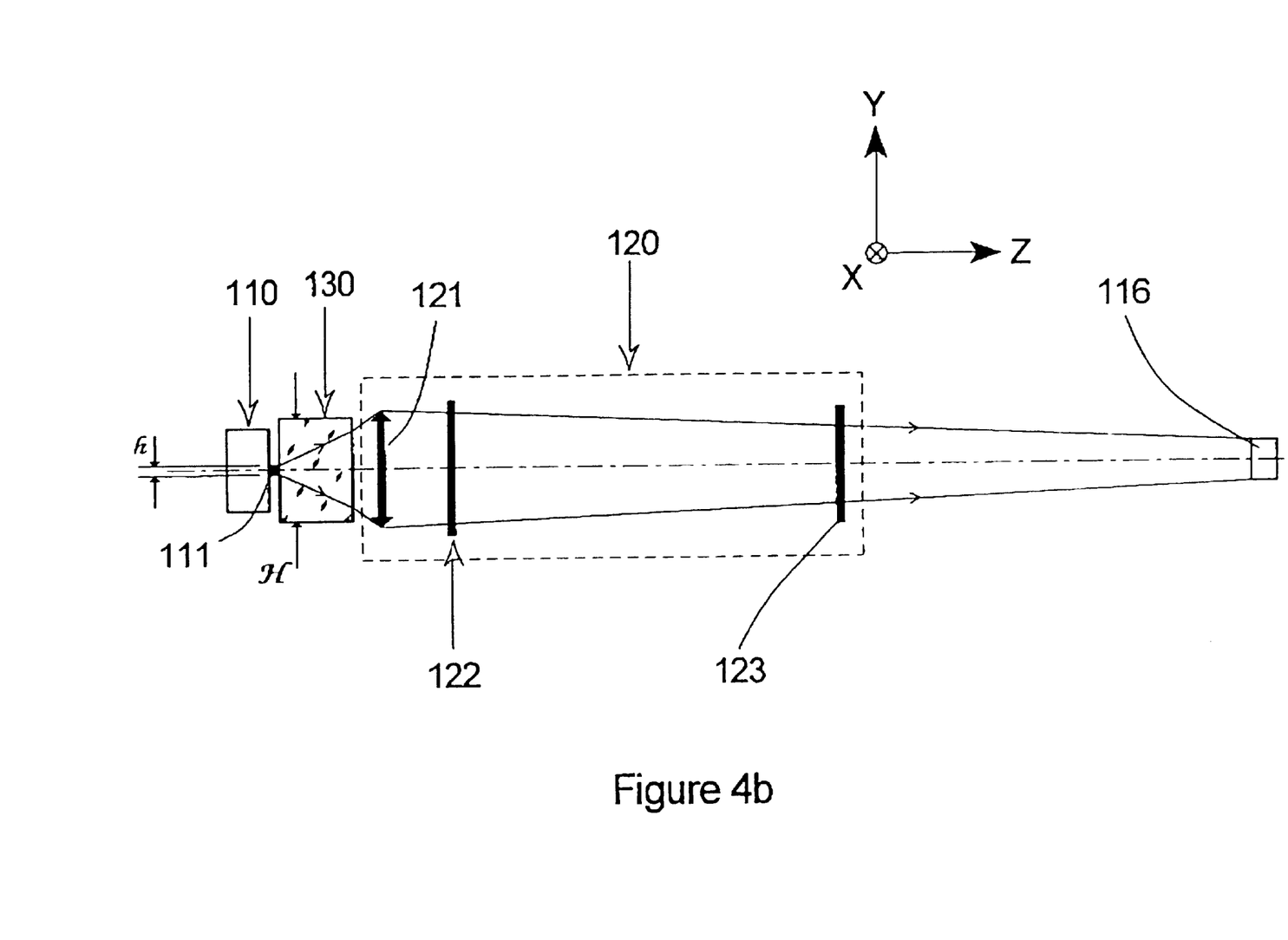
Figure 4C:
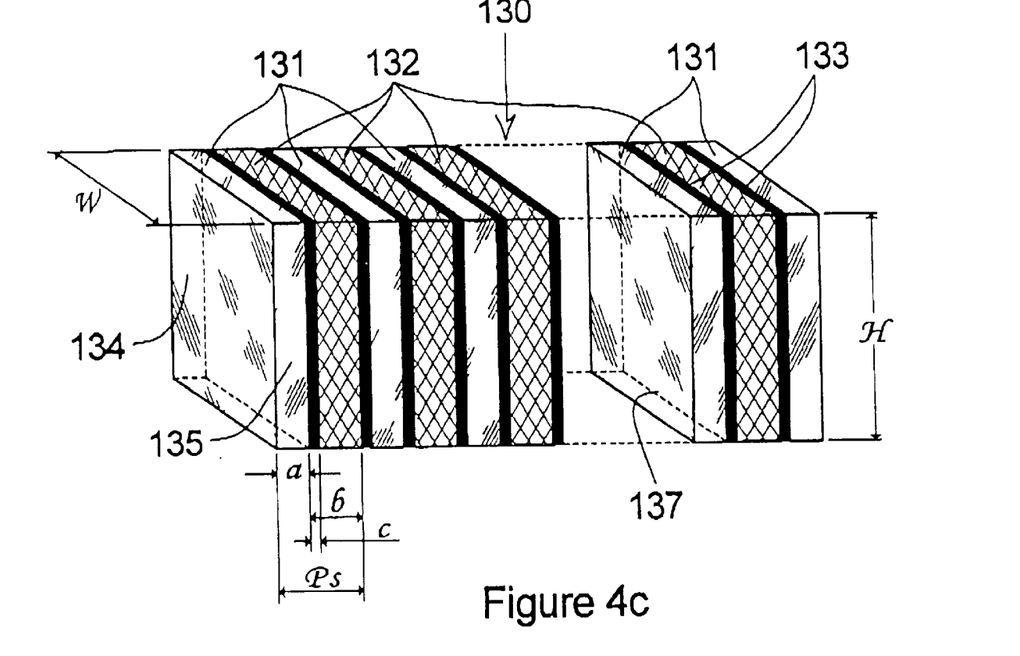
FIGS. 4c and 4d are isometric views of exemplary arrays of one-dimensional micro-scramblers according to the present invention.

FIGS. 4a and 4b schematically illustrate one exemplary SLM illumination system of the present invention. FIG. 4a presents the beams propagation in the X-Z plane (the slow axis plane), and FIG. 4b presents the beams propagation in the Y-Z plane (the fast axis plane). LDA 110 has a number of multimode emitting members 111, of length $\mathcal{L}$ and height $h$. The pitch of the array is $\mathcal{P}$. An array 130 of Micro-Scramblers 131 (MS) is placed in close proximity to the exit apertures of the emitters 111. The MS 131 is designed to scramble the light only in the slow axis direction and therefore it is referred to herein as 1D MS (one dimensional micro-scramblers). Preferably, the number of the 1D MS 131 in the array 130 equals the number of the emitters 111 in the LDA 110. The LDA 110 and the MS array 130 are precisely aligned so that an entrance aperture 134 (FIG. 4c) of each 1D MS 131 is positioned in front of each emitter 111. The thickness of the 1D MS 131 is then chosen to be the same or slightly bigger than the length of the emitters 111: $a \cong \mathcal{L}$. The light emitted from each emitter 111 enters the corresponding entrance aperture 134 of the 1D MS 131. Inside the 1D MS 131, each beam experiences a number of bouncings from the vertical walls of the MS 131, before exiting on the opposite side through the exit aperture 135 (FIG. 4c). Due to these multiple reflections, the light is spatially scrambled in the slow axis direction and the illumination of the exit aperture 135 is relatively uniform in the slow axis direction. At the same time, the height $\mathcal{H}$ of the 1D MS 131 is chosen big enough, so that the beam propagation in the fast axis direction is altered only by the Snell refraction (FIG. 4b). For example, if the beam divergence in the fast axis direction is α (the full angle), and the length of the MS 131 is $l$, then $\mathcal{H} > 2 \cdot \tan(\alpha/2) \cdot l$.

FIGS. 4a and 4b also illustrate one exemplary illuminating system 120. It is designed of anamorphic fast axis imaging lens 121 and a slow axis imaging system—anamorphic lens array 122 and anamorphic lens 123. The object plane of the fast axis lens 121 coincides with the plane of the emitters 111. The image plane of the fast axis lens 121 coincides with the SLM 116.

The slow axis imaging part consists of array 122 of anamorphic collimating microlenses 122a (FIG. 4a) and the field lens 123. Preferably, the number of the microlenses 122a in the array 122 equals the number of the emitters 111 of the LDA 110. Each microlens 122a is assigned to a specific emitter 111. Lens 123 is also anamorphic and is common for all emitters. The object plane of the lens system 122–123 coincides with the plane of the exit apertures 135 of the 1D MSs 131, while the image plane coincides with the SLM 116. The power distribution in the slow axis direction of the SLM 116 illumination is uniform, because it results from imaging the exit apertures 135 of the 1D MSs 131, which illumination is relatively uniform as will be shown below.

Figure 4D:
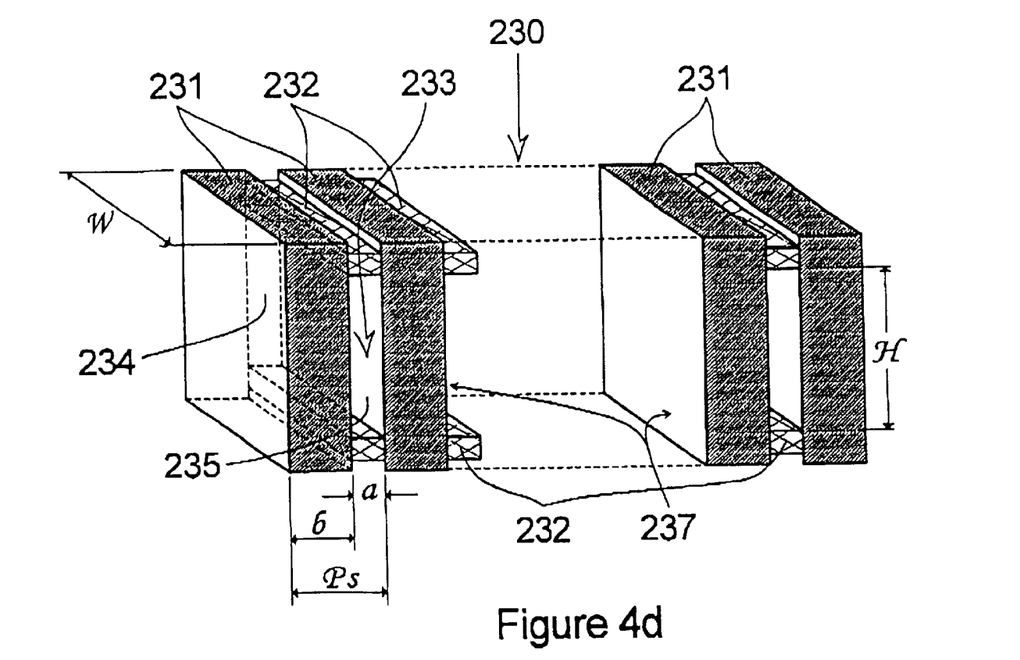

Examples of a multi-channel 1D MS are schematically illustrated in FIGS. 4c and 4d.

FIG. 4c presents a periodic structure with period $\mathcal{P}s$ containing optical windows 131 and spacers 132. The transparent optical windows 131 have thickness a=$\mathcal{L}$, length $\mathcal{W}$, height $\mathcal{H}$ and index of refraction n. The entrance aperture of the windows 131 is denoted by 134 and the exit aperture is denoted by 135. The spacers 132 can be of the same or different material as the windows 131 and with approximately the same height $\mathcal{H}$ and length $l$. The windows 131 and the spacers 132 are bonded together with optical cement, glue, etc. 133 of thickness c. The thickness c and the index of refraction n1 of the optical cement layers 133 are chosen so that the condition for Total Internal Reflection ("TIR") on the interface 131–133 is fulfilled for all beams emitted in the slow axis direction. The thickness of the spacer 132 is then chosen to fulfill the condition $a+b+c==\mathcal{P}s=\mathcal{P}$, where $\mathcal{P}$ is the LDA pitch (FIGS. 1a, 4a). The light beams entering the entrance aperture 134 of the window 131 experience a number of TIRs from its vertical walls before exiting on the opposite side through the exit aperture 135. Due to these multiple reflections, a beam entering the window 131 at a particular X-coordinate value $X1$ of the entrance aperture 134, will exit the window at a different X-coordinate value $X2$ of the exit aperture 135 (FIG. 4a). Moreover, depending of the number of TIRs the beam experiences (odd or even), the propagation direction of the beam regarding the slow axis can be reversed. Thus, the light is spatially scrambled in the slow axis direction and the illumination of the exit aperture 135 is relatively uniform in this direction. At the same time, the height $\mathcal{H}$ of the windows 131 is chosen big enough, so that the beam propagation in the fast axis direction is altered only by the Snell refraction (FIG. 4b). In other words, the windows 131 act as 1D MS.

FIG. 4d illustrates another approach to designing an array of 1D MS according to the present invention. The array 230 of 1D MS is a stack of double-sided mirrors 231 and spacers 232. In this embodiment, the optical beams experience multiple reflections by the mirrors' reflective surfaces 237 and propagate in the free space between them. In other words, the space between two neighboring mirrors 231 in the array 230 constitutes a 1D MS with length $l$, height $\mathcal{H}$, and with entrance and exit apertures 234 and 235, respectively. The pitch of such an array is $\mathcal{P}s=a+b=\mathcal{P}$, where $\mathcal{P}$ is the LDA pitch (FIG. 4a) and a and b are the thickness of the spacers 232 and the mirrors 231, respectively. In this embodiment, the distance between the mirrors (thickness of the spacers) includes the thickness of the bonding material (glue, optical cement, etc.), and equals the LDA emitter length: $a=\mathcal{L}$. The operation of the 1D MSs of FIG. 4d is similar to that of FIG. 4c, with the following differences:

1) The multiple bouncing from the 1D MS vertical walls is due not to TIR but a reflection from mirrors 231;
2) The beam propagation between the reflections is in free space and therefore is not altered in the fast axis direction; and
3) It can be expected that this design will have relatively higher energy losses due to the non-ideal reflective coating of the mirrors 231.

The designs of FIGS. 4c and 4d are only exemplary ones. It will be appreciated by any person skilled in the art that there are other methods of designing an array of 1D micro-scramblers. For example, the sidewalls 137 of the windows 131 of FIG. 4c may be coated with a highly reflecting coating (Gold, Aluminum, Silver, etc.) prior to bonding the array. In this case, the 1D MS will operate not on TIR but on simple reflection from the reflective coating, similar to the design of FIG. 4d.

Figure 5A:
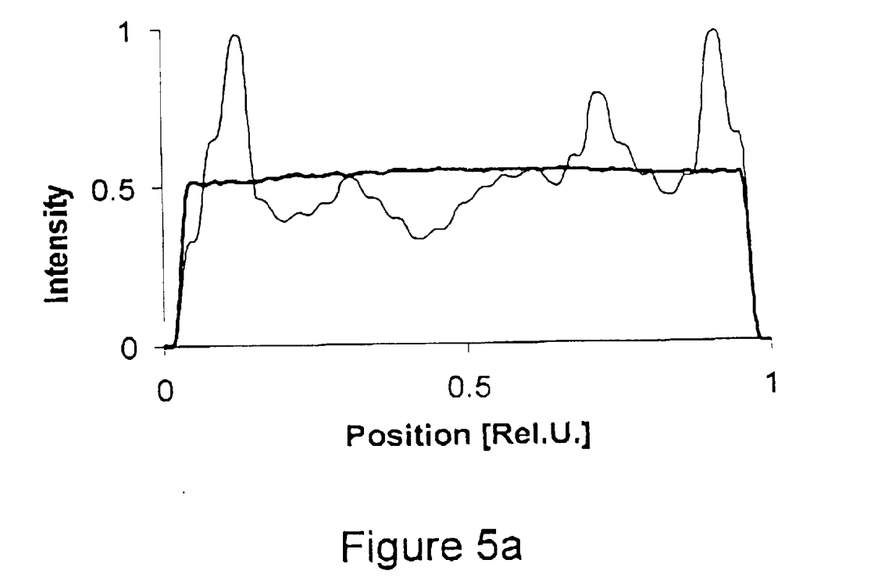
FIGS. 5a through 5c present the power distribution along the slow axis of the emitters near field, at the exit aperture of the one-dimensional micro-scrambler and at the SLM, respectively, according to the present invention.
Figure 5B:
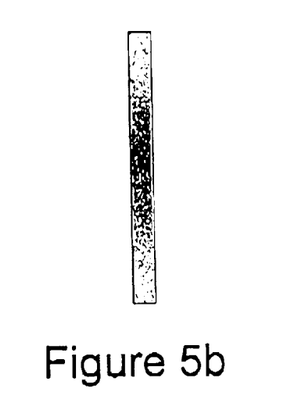
Figure 5C:
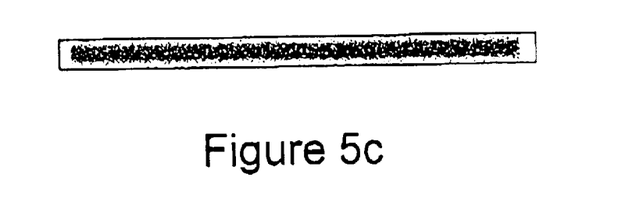

FIG. 5a illustrates the scrambling capabilities of one 1D MS element 131 of the array 130 of FIG. 4c, or the array 230 of FIG. 4d, by presenting the near field power distributions in the slow axis direction of a 150 μm long and 1 μm wide multimode emitter 111a (thin line) and of the exit aperture 135 of the 1D MS 131 (thick line). In this example, the light scrambler 131 was chosen with dimensions $a\times l\times\mathcal{H}=0.15\times 2\times 2$ mm and was placed at a distance of 10 μm from the emitter. FIGS. 5b and 5c illustrate the spatial power distribution at the exit aperture of the one 1D MS element 131 of the array 130 and at the SLM, respectively, according to the present invention.

Figure 6:
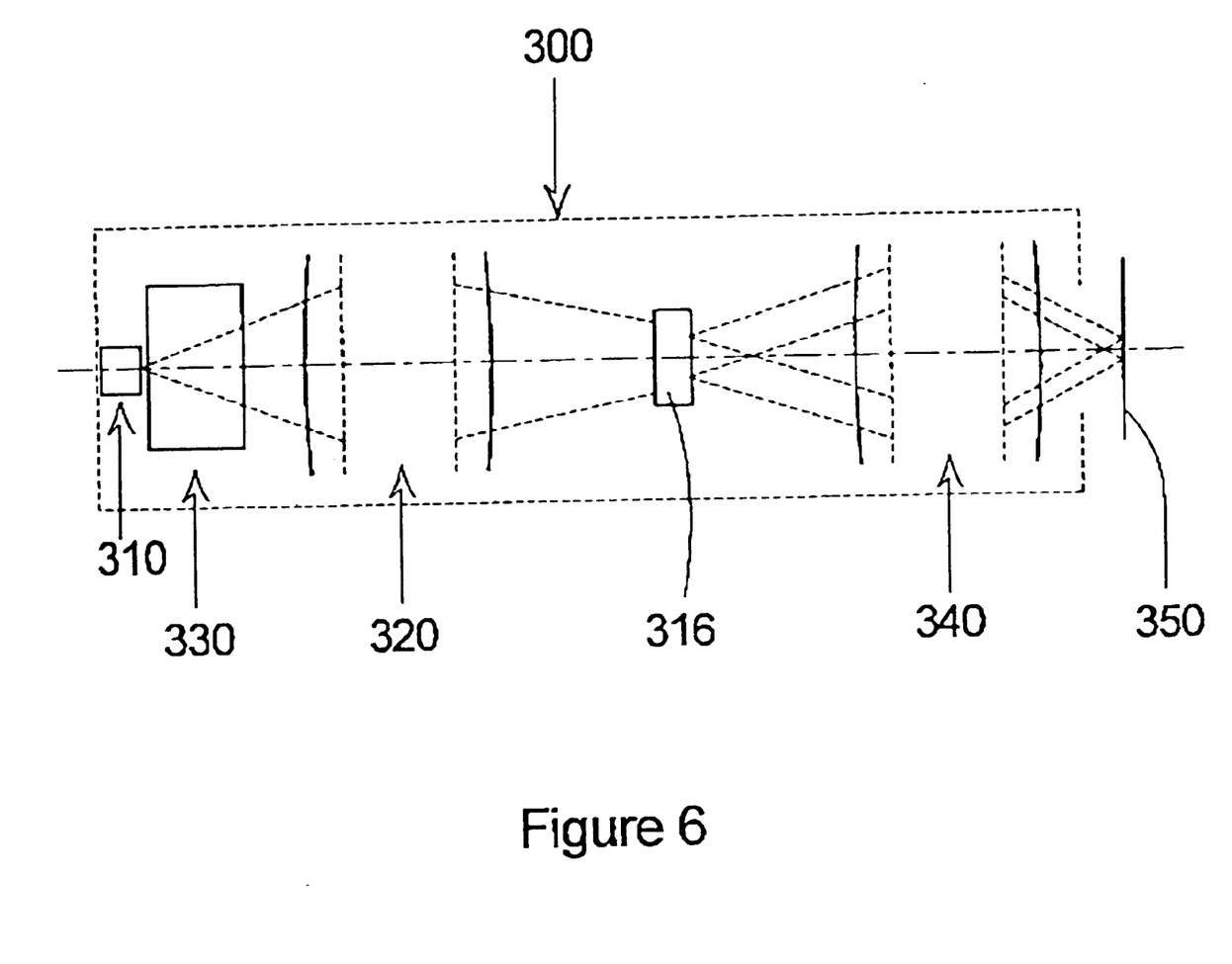
FIG. 6 schematically illustrates a typical design of an optical imaging head incorporating LDA-SLM system with an array of 1D MSs according to the present invention.

FIG. 6 schematically illustrates a typical design of an optical imaging head incorporating LDA-SLM system with an array of 1D MSs according to the present invention. The head 300 comprises a light source, e.g., LDA 310, an array of 1D MSs 330, illumination optics 320, SLM 316 and an imaging lens 340. The light from the individual emitters of the LDA 310 is scrambled in the slow axis direction by the 1D MSs of the array 330. In this example, one 1D MSs of the array 330 is assigned to each emitter of the LDA 310. The illumination optical system 320 accepts the light emerging from the exit apertures of the 1D MSs (135 and 131 respectively in FIG. 4a) and conveys it to SLM 316. The illumination optical system 320 can be, for example, as illustrated in FIG. 4a. Because of the involvement of the 1D MS array 330, the illumination of the SLM 316 has a uniform energy distribution, close to the desired square distribution illustrated in FIG. 3c. Thus, all the energy reaching the SLM 316 can be used in the imaging process. Consequently, the light reaching the SLM 316 is spatially modulated by the SLM. The imaging lens 340, preferably telecentric, produces a real image of the SLM on the imaging medium 350.

Figure 7:
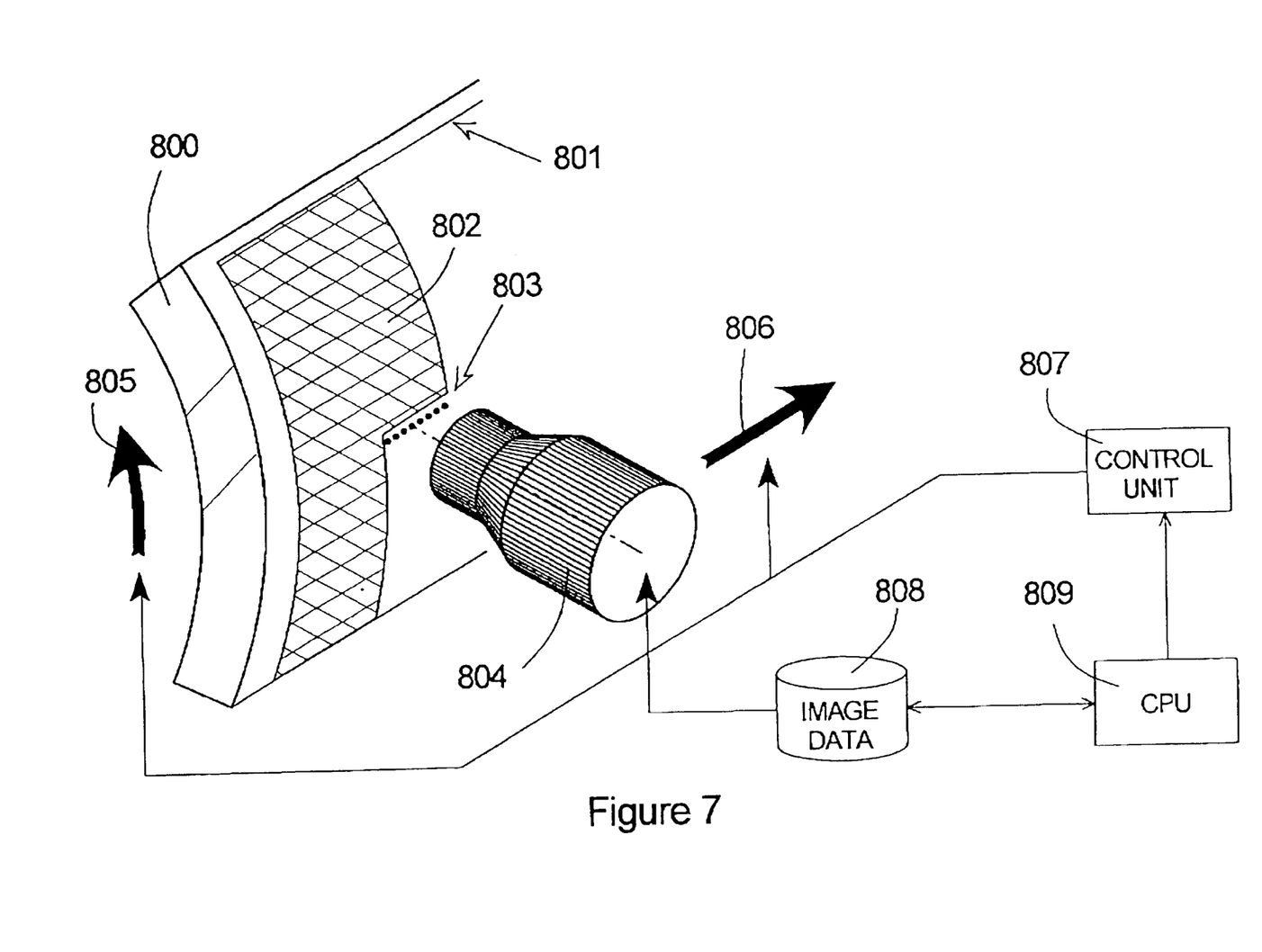
FIG. 7 is a schematic isometric view of an external-drum-type electro-optical plotter with an optical imaging head incorporating an LDA, SLM, and a one-dimensional micro-scrambler according to the present invention.

Optical imaging head as described above in reference to FIG. 6 can be used, as mentioned hereinabove, in electro-optical plotters for offset plates, laser transfer media, etc. FIG. 7 illustrates an exemplary design of such an electro-optical plotter. The photosensitive medium (offset plate, etc.) 801 is wrapped around a rotating drum 800. Optical head 804, incorporating an LDA-SLM system of the present invention with array 1D MSs, produces a plurality of spots 803 on the photosensitive medium 801. The drum rotates with substantially constant speed in the direction indicated by arrow 805, while the optical head 804 moves parallel to the drum axis (not shown) in the direction marked by arrow 806. The system is being driven by a central processor 809, which by means of control unit 807 synchronizes the two movements 806 and 805, and the data transfer between the image data bank 808 and the optical head 804. The digital equivalent of the image to be written on the photosensitive medium is stored in the image data bank 808, from where it is transferred to the optical head 804, which by means of producing a plurality of light spots 803 on the photosensitive medium 801, forms the desired image 802.

Figure 8:
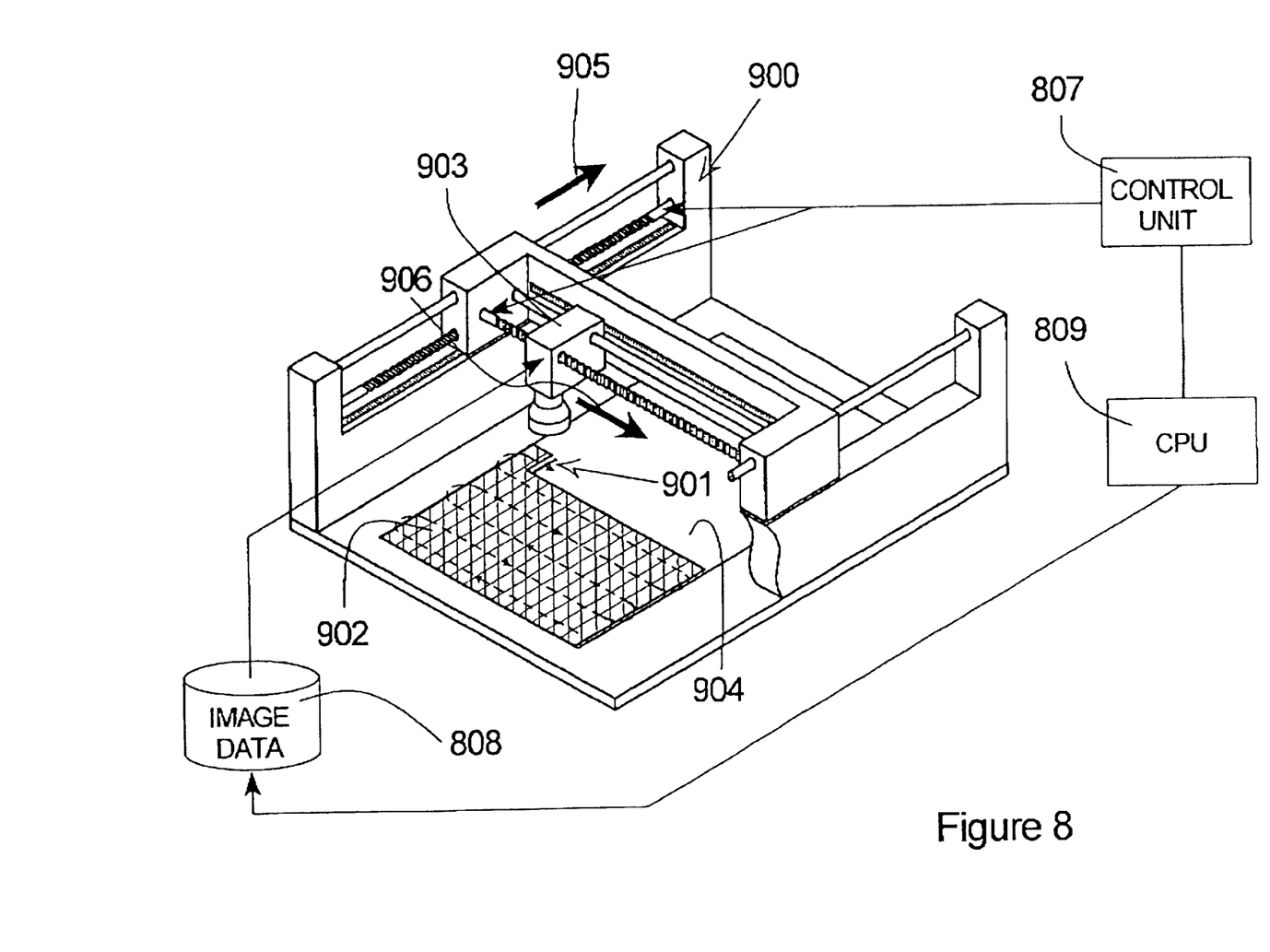
FIG. 8 is a schematic isometric view of a flatbed-type electrooptical plotter with an optical imaging head incorporating an LDA, SLM, and a one-dimensional micro-scrambler according to the present invention.

FIG. 8 illustrates an electro-optical plotter of flatbed type, with optical head 903 incorporating LDA-SLM system with array 1D MSs. The photosensitive medium 904 is placed on a flat surface of an X-Y scanning engine 900. The digital equivalent of the image to be written on the photosensitive medium is stored in the image data bank 808, from where it is transferred to the optical head 903, which by means of producing a plurality of light spots 901 on the photosensitive medium 904, forms the desired image 902. The scanning movement of the optical head 903 in two perpendicular direction 905 and 906, is controlled by a central processor 809, through control unit 807. The CPU 809 also synchronizes the data flow from the image data bank 808 to the optical head 903 with the scanning movements 905 and 906.

Although the invention has been described and illustrated in the foregoing exemplary embodiments, it is understood that the present disclosure has been made only by way of example, and that numerous changes in the details of construction and combination and arrangement of processes and equipment may be made without departing from the spirit and scope of the invention as claimed below.

What is claimed is:

1. An optical head comprising:
   an array of laser diodes (LDA), each member of said LDA having a fast axis direction and a slow axis direction of beam divergence;
   a spatial light modulator (SLM);
   an imaging lens; and
   a Micro-Scramblers array (MSA), each member of said MSA having exit apertures and each member of said MSA is associated with a member of said LDA for scrambling the light only in the direction of said slow axis of said member of the LDA.

2. The optical head of claim 1 wherein said LDA is an array of ordered individual laser emitters.

3. The optical head of claim 1 wherein said LDA is a laser-diode bar.

4. The optical head of claim 1 wherein said LDA is a laser-diode stack.

5. The optical head of claim 1 wherein said LDA having exit apertures and wherein said MSA is placed in close proximity to the exit apertures of said LDA.

6. The optical head of claim 5 wherein said MSA comprises a periodic structure containing optical windows and spacers.

7. The optical head of claim 6 wherein said spacers and said optical windows are bonded together and have substantially equal height and length.

8. The optical head of claim 6 wherein the optical windows of said MSA have a plurality of sidewalls and wherein said plurality of sidewalls are coated with a reflecting coating.

9. The optical head of claim 6 wherein the number of said optical windows equals the number of said laser diodes in said LDA.

10. The optical head of claim 1, additionally comprising:
a. an anamorphic fast axis imaging lens; and
b. a slow axis imaging system comprising an anamorphic lens array and an anamorphic lens,
wherein the object plane of said fast axis imaging lens coincides with the plane of said LDA and the image plane of said fast axis imaging lens coincides with said SLM, and wherein the number of microlenses in said anamorphic lens array equals the number of said laser diodes in said LDA and said slow axis anamorphic lens is common for all emitters and wherein the object plane of said imaging system coincides with the plane of exit apertures of said MSA and the image plane of said imaging system coincides with said SLM.

11. An external-drum electro-optical plotter comprising:
an optical head comprising
an array of laser diodes (LDA), each member of said LDA having a fast axis direction and a slow axis direction of beam divergence;
a spatial light modulator (SLM);
an imaging lens; and
a Micro-Scramblers array (MSA), each member of said MSA having exit apertures and each member of said MSA is associated with a member of said LDA for scrambling the light only in the direction of said slow axis of said member of the LDA.

12. A flatbed electro-optical plotter comprising:
an optical head comprising
an array of laser diodes (LDA), each member of said LDA having a fast axis direction and a slow axis direction of beam divergence;
a spatial light modulator (SLM);
an imaging lens; and
a Micro-Scramblers array (MSA), each member of said MSA having exit apertures and each member of said MSA is associated with a member of said LDA for scrambling the light only in the direction of said slow axis of said member of the LDA.

13. A method of producing a plurality of writing spots on a photosensitive medium, comprising the steps of:
i. providing an array of laser diode emitters (LDA), said LDA having exit apertures and each member of said LDA having a fast axis direction and a slow axis direction of beam divergence;
ii. providing an array of Micro Scramblers (MSA), said MSA having exit apertures and each of said individual Micro Scramblers associated with one of said laser diode emitters for scrambling light only in the direction of said slow axis;
iii. providing a spatial light modulator (SLM);
iv. providing optical means for imaging the exit apertures of said MSA; and
v. imaging the exit aperture of each of said Micro Scramblers on said photosensitive medium.

14. The method of claim 13 wherein said array of microscramblers is placed in close proximity to the exit apertures of said laser diodes.

15. The method of claim 14 wherein said MSA comprises a periodic structure containing optical windows and spacers.

16. The method of claim 15 wherein said spacers and said windows are bonded together and have substantially equal height and length.

17. The method of claim 15 wherein the optical windows of said MSA have a plurality of sidewalls and wherein said plurality of sidewalls are coated with a reflecting coating.

18. The method of claim 15 wherein the number of said optical windows equals the number of said laser diodes.

19. The method of claim 13, wherein said optical means comprises
a. an anamorphic imaging lens for imaging said fast axis; and
b. imaging system for imaging said slow axis, said imaging system comprising an anamorphic lens array and an anamorphic lens,
wherein the object plane of said fast axis lens coincides with the plane of said LDA and the image plane of said fast axis lens coincides with said SLM, and wherein the number of the microlenses in said anamorphic lens array equals the number of said laser diodes and said slow axis anamorphic lens is common for all emitters and wherein the object plane of said imaging system coincides with the plane of the exit apertures of said MSA and the image plane of said imaging system coincides with said SLM.

* * * * *